US012631489B1

(12) United States Patent (10) Patent No.: US 12,631,489 B1
Perillo et al. (45) Date of Patent: May 19, 2026

(54) SPECTROSCOPIC BIOMETRIC USER ASSESSMENT SYSTEM

(71) Applicant: AMAZON TECHNOLOGIES, INC., Seattle, WA (US)

(72) Inventors: Evan Perillo, Woodinville, WA (US); Baomin Wang, Herndon, VA (US); Abhinav Kashyap, Redmond, WA (US); Brendan Pratt, Bethel, CT (US); Yufei Jia, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 217 days.

(21) Appl. No.: 18/064,862

(22) Filed: Dec. 12, 2022

(51) Int. Cl.
    *G01J 3/28* (2006.01)
    *G01J 3/02* (2006.01)
    *G06V 10/143* (2022.01)

(52) U.S. Cl.
    CPC ........... *G01J 3/2823* (2013.01); *G01J 3/0224* (2013.01); *G06V 10/143* (2022.01)

(58) Field of Classification Search
    CPC .......... G01J 3/2823; G01J 3/0224; G01J 3/46; G01J 3/00; G06V 10/143; B01F 35/2131
    USPC ........................................ 356/326, 402, 424
    See application file for complete search history.

(56) References Cited

U.S. PATENT DOCUMENTS

| | | | | |
|---|---|---|---|---|
| 9,659,205 | B2 * | 5/2017 | Demos ................... | G06V 40/10 |
| 11,126,879 | B1 | 9/2021 | Vemulapalli et al. | |
| 2005/0281440 | A1 | 12/2005 | Pemer | |
| 2007/0268485 | A1 * | 11/2007 | Polonskiy ............ | G06V 40/166 356/419 |

(Continued)

FOREIGN PATENT DOCUMENTS

| | | |
|---|---|---|
| CN | 107832712 A | 3/2018 |
| CN | 110110597 A | 8/2019 |

(Continued)

OTHER PUBLICATIONS

"Mini-spectrometer, Micro series C1266MA", Hamamatsu Photonics, K. K., Solid State Division, Japan, Feb. 2022, pp. 1-10. Retrieved from the Internet: URL: https://www.hamamatsu.com/content/dam/hamamatsu-photonics/sites/documents/99_SALES_LIBRARY/ssd/c12666ma_kacc1216e.pdf.

(Continued)

*Primary Examiner* — Tarifur R Chowdhury
*Assistant Examiner* — Kaitlyn E Kidwell
(74) *Attorney, Agent, or Firm* — Lindauer Law, PLLC

(57) ABSTRACT

An input device assesses an object in a field of view using multi-wavelength reflectance spectroscopy to determine if the object is an actual user or an artifact. Light sources are operated to illuminate an object. For example, the object may be illuminated with white, violet, and infrared light simultaneously. A spectrometer comprising a plurality of detectors, each with associated wavelength filters determines intensity data indicative of intensity of light of these different colors as reflected from the object. The intensity data is processed to determine whether the object is part of a user or is an artifact. For example, if the object is deemed to be a user, biometric input may be acquired. The biometric input may then be processed to identify the user. The input device may be used at various locations, such as at an entry portal, point of sale, under direct solar illumination, and so forth.

20 Claims, 6 Drawing Sheets

(56)　　　　　　References Cited

U.S. PATENT DOCUMENTS

| | | | | |
|---|---|---|---|---|
| 2008/0107309 A1* | 5/2008 | Cerni | .................... | G06V 40/67 |
| | | | | 382/115 |
| 2010/0127827 A1* | 5/2010 | Watanabe | ............. | G06V 40/23 |
| | | | | 340/5.83 |
| 2015/0356339 A1* | 12/2015 | Demos | ................... | H04N 23/74 |
| | | | | 348/77 |
| 2016/0019420 A1* | 1/2016 | Feng | ...................... | G06V 40/45 |
| | | | | 382/117 |
| 2017/0292908 A1* | 10/2017 | Wilk | ................... | G01N 21/359 |
| 2018/0060554 A1* | 3/2018 | Kontsevich | ............. | G06F 21/32 |
| 2018/0173980 A1 | 6/2018 | Fan et al. | | |
| 2020/0082192 A1 | 3/2020 | Ping et al. | | |
| 2022/0121869 A1 | 4/2022 | Miura et al. | | |
| 2022/0300593 A1* | 9/2022 | Brownlee | .......... | G06V 40/1353 |
| 2023/0063482 A1* | 3/2023 | Setterberg | ............ | G06V 10/143 |

FOREIGN PATENT DOCUMENTS

| | | | |
|---|---|---|---|
| CN | 110414346 A | 11/2019 | |
| CN | 110516644 A | 11/2019 | |
| CN | 110969077 A | 4/2020 | |
| CN | 111241919 A | 6/2020 | |
| CN | 111274928 A | 6/2020 | |
| CN | 111783640 A | 10/2020 | |
| EP | 2315063 A2 | 4/2011 | |
| IN | 110119719 A | 8/2019 | |
| SG | 10202005395 | 1/2021 | |

OTHER PUBLICATIONS

Carrier, Stacey, "Considerations for Diffuse Reflection Spectroscopy", American Laboratory, Sep. 1, 2016, 6 pgs. Retrieved from the Internet: URL: https://www.americanlaboratory.com/914-Application-Notes/190743-Considerations-for-Diffuse-Reflection-Spectroscopy/.

Drahansky, Martin, "Liveness Detection in Biometrics", Advanced Biometric Technologies, Aug. 9, 2011, 30 pgs. Retrieved from the Internet: URL: https://www.intechopen.com/books/advanced-biometric-technologies/liveness-detection-in-biometrics.

Hengfoss, et al., "Dynamic liveness and forgeries detection of the finger surface on the basis of spectroscopy in the 400-1650 nm region", Science Direct, Forensic Science International, vol. 212, Issues 1-3, Oct. 10, 2011, 7 pgs. Retrieved from the Internet: URL: https://www.sciencedirect.com/science/article/abs/pii/S0379073811002295.

Pishva, Davar, "Multi-Factor Authentication Using Spectral Biometrics", Journal of Japan Society for Fuzzy Theory and Intelligent Informatics, vol. 19, Issue 3, 2007, 8 pgs. Retrieved from the Internet: URL: https://www.jstage.jst.go.jp/article/jsoft/19/3/19_3_256/_pdf.

Spragg, Richard, "Reflection Measurements in IR Spectroscopy", PerkinElmer, Technical Note, 2013, 5 pgs. Retrieved from the Internet: URL: https://www.perkinelmer.com/lab-solutions/resources/docs/TCH_reflection-Measurements.pdf.

Tang, et al., "Face Flashing: a Secure Liveness Detection Protocol based on Light Reflections", Network and Distributed Systems Security (NDSS), Symposium 2018, Feb. 2018, 15 pgs. Retrieved from the Internet: URL: https://cse.buffalo.edu/~wenyaoxu/courses/fall2020/CSE741_Fall2020_Ref/Face_Flashing.pdf.

Zonios, et al., "Skin Melanin, Hemoglobin, and Light Scattering Properties can be Quantitatively Assessed In Vivo Using Diffuse Reflectance Spectroscopy", Science Direct, Journal of Investigative Dermatology, vol. 117, Issues 6, Dec. 2001, 18 pgs. Retrieved from the Internet: URL: https://www.sciencedirect.com/science/article/pii/S0022202X15414836#bb0090.

* cited by examiner

SPECTROSCOPIC BIOMETRIC USER ASSESSMENT SYSTEM

BACKGROUND

Facilities such as stores, libraries, hospitals, offices, apartments, and so forth, may need the ability to identify users at the facility or acquire other input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 1 illustrates a system including an input device to provide spectroscopic biometric user assessment, according to some implementations.

Figure 2:
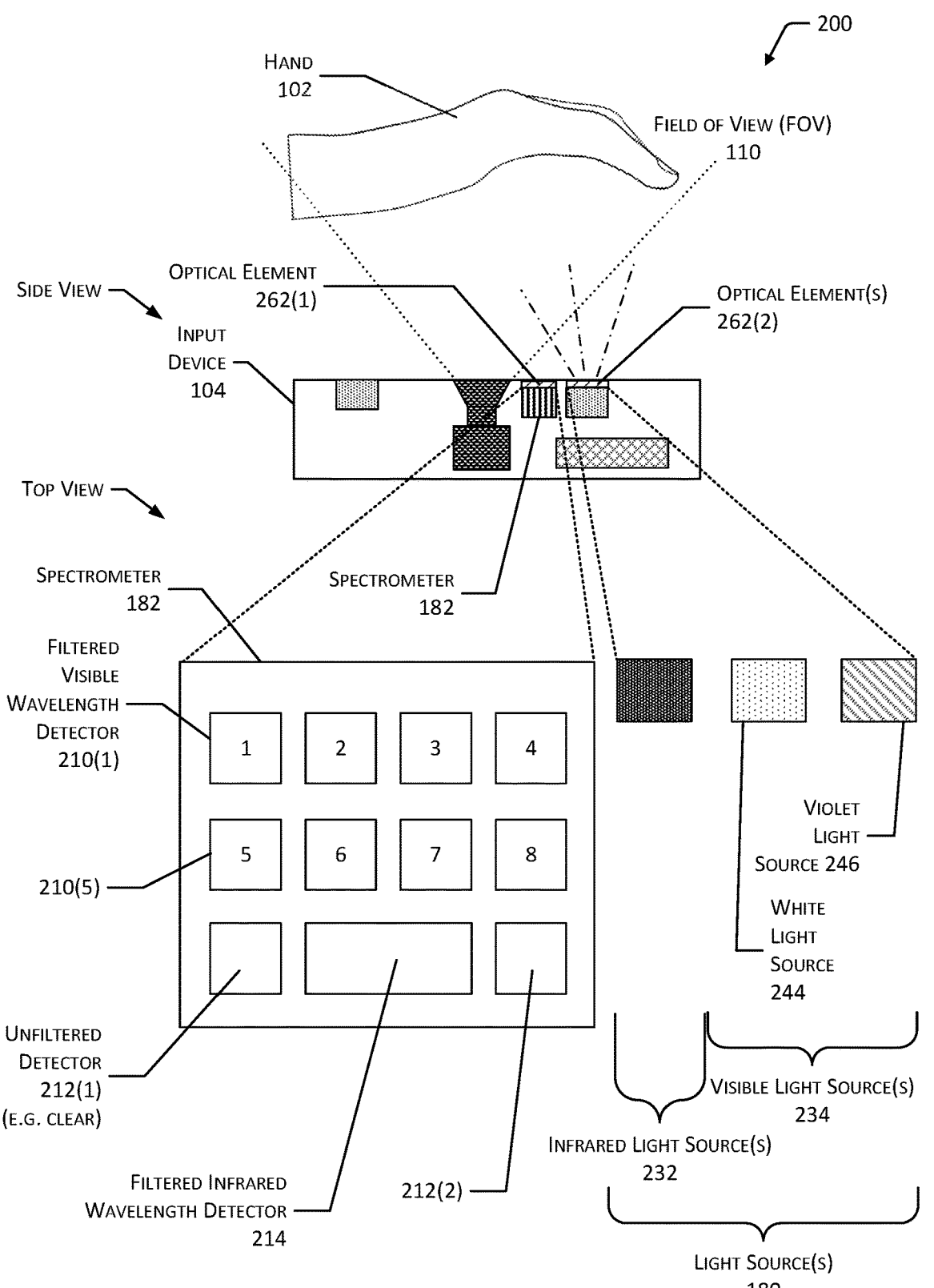
FIG. 2 illustrates the input device with light sources, a spectrometer, and other possible components, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast acquisition of input by an input device may be used in a variety of ways including determining if physical access is permitted, determining a payment method to be used, and so forth. Different kinds of input may include use of EMV cards, optical barcodes, biometric input, and so forth. In one implementation, biometric input may be used to control physical access to a facility or portion thereof. For example, entrance to an office, residence, warehouse, transportation facility, or other location, may be responsive to a user presenting biometric input at an entry portal.

In another implementation, biometric input may be used to facilitate payment for goods or services. For example, an input device may be used at a point-of-sale (POS). Biometric input may be obtained and used to determine an identity of the user. The identity of the user may then be associated with a payment method, such as an account, previously stored bank or credit card account, and so forth. Continuing the example, a user may also present a barcode coupon at the POS to obtain a discount on the remaining balance of the transaction. The barcode may be presented that is printed or is shown on a display of another device. Other operations may also be facilitated by the input device. For example, a user may use the input device to associate an account indicated by an EMV card with their biometric input.

In another situation the input device may use a multifactor authentication approach based on biometric input as well as a physical token, such as a smart card that is in the possession of the user. Such multifactor authentication may be used to sign an electronic record. For example, the combination of biometric input and the physical token may be used to provide information as to the particular user who agreed to a contract, accepted a delivery, and so forth.

Traditional systems for identifying users suffer from several significant drawbacks including susceptibility to presentation attacks, lack of speed, inaccuracy, and operational limitations. Biometric identification systems identify users based on a characteristic of the particular individual that is difficult or impossible to copy or be transferred. Operation of traditional biometric identification systems introduce operational problems such as slow data acquisition, limited resolution, increased wear in heavy-use environments, and so forth. For example, traditional palm-based biometric identification systems require physical contact between the user's hand and a scanning device. This physical contact may be deemed unsanitary and may be difficult to accomplish for some users. These traditional systems are also susceptible to presentation attacks involving an artifact that attempts to produce biometric input. For example, a presentation attack may attempt to use an artifact comprising a plastic model of a hand to pose as another user.

Described in this disclosure is an input device that implements a system for spectroscopic biometric user assessment. An object within a field of view is illuminated with many different wavelengths, such as white light, violet light, and infrared light. While illuminated, a spectrometer acquires intensity data indicative of reflected light at several different wavelengths. The spectrometer acquires intensity data for two or more wavelengths during the same interval of time. In one implementation, the assessment may be based on ratios of intensity data indicative of a relative intensity of reflected light of different wavelengths. For example, a real hand reflects different colors of light with relative intensities that differ from an artifact.

The system uses one or more light sources that, when operated, emit a plurality of wavelengths. For example, the light sources may include a white light source, a violet light source, and an infrared light source. This light illuminates an object within a field of view, such as a hand or artifact. Two or more of the light sources may be operated simultaneously. For example, the white light source and the violet light source may be on at the same time. In another example, all light sources may be on at the same time.

While the light sources are emitting light in a plurality of wavelengths, a spectrometer is used to acquire a set of intensity data. The spectrometer may comprise a multichannel device, with each channel associated with a particular wavelength or range of wavelengths. For example, a first channel may measure light with a wavelength of 415 nanometers (nm), a second channel may measure light with a wavelength of 445 nm, and so forth. In one implementation, the spectrometer may utilize a plurality of wavelength-specific devices. For example, a photodiode sensitive to 415 nm light and not to other wavelengths may be used to provide data for the first channel. In another implementation, the spectrometer may utilize a plurality of filtered detectors, each comprising a wavelength filter and a detector. The wavelength filter is selected to pass the wavelength of interest, or a narrowband range of wavelengths associated with the wavelength of interest. Incident light that passes through the wavelength filter impinges on the detector and provides data for a channel associated with that wavelength. In some implementations the spectrometer may include a "clear" or unfiltered or broad wavelength detector.

The spectrometer provides concurrent data acquisition for a plurality of different wavelengths. For example, the spectrometer may concurrently acquire intensity data for incident light at 415 nm, 445 nm, 480 nm, 515 nm, . . . , and 940 nm. Operation of the light sources is coordinated to provide illumination during data acquisition. Because the spectrometer acquires intensity data for a plurality of different wavelengths during the same time interval, the illumination may be polychromatic. For example, the object may be illuminated with white, violet, and infrared light simultaneously while the spectrometer acquires intensity data for a plurality of wavelengths.

The intensity data is processed to determine if the user is present. This determination is based on how an object illuminated by the one or more light sources reflects light to the detector. In one implementation, a set of ratio values may be calculated based on intensity of a first color divided by intensity of a second color. For example, the intensity data may be used to calculate a first ratio of 415 nm intensity to 590 nm intensity, a second ratio of 415 nm intensity to 940 nm intensity, a third ratio of 590 nm intensity to 415 nm intensity, and so forth. The set of ratio values may be used to determine a value indicative of user presence.

By using the spectrometer with narrowband acquisition of intensity data at particular wavelengths and illuminating the object with a broadband plurality of different wavelengths, such as two or more of white light, violet light, or infrared light, the system may be utilized in a variety of different ambient lighting conditions. The system provides intensity data with usable signal-to-noise ratio (SNR) in ambient lighting environments ranging from complete darkness to brighter than direct solar illumination. The system is also able to provide intensity data in the presence of ambient lighting with different color temperatures.

Acquisition of the intensity data may be acquired during one or more timeslots, or intervals. In some implementations, hardware limitations of the spectrometer may require integration of intensity data during two or more timeslots. For example, multiplexing constraints may require integration and readout of intensity data for less than all channels during a single timeslot. In such implementations the acquisition of intensity data may occur during two or more timeslots. During timeslots for which intensity data is being acquired, the light sources corresponding to the wavelengths being assessed are operated.

The system may utilize various techniques to prevent anomalous conditions, such as resulting from spoofing. In one implementation, the output intensity of the light sources used during different timeslots for data acquisition may be varied from time to time. For example, during a first timeslot the light sources may be operated with a first output intensity while during a second timeslot the light sources are operated with a second output intensity that differs from the first. An anomalous condition, such resulting from spoofing, may be deemed to have occurred if the intensity of incident light exceeds an expected intensity associated with the output intensity used to operate the light sources.

In another implementation, a time interval between timeslots associated with intensity data acquisition used to assess the object may be varied. For example, a first set of intensity data may be acquired during timeslot 1, a second set of intensity data may be acquired during timeslot 4, a fourth set of intensity data may be acquired during timeslot 5, and so forth. In a further implementation, intensity data may be determined for interacquisition timeslots, those times in between acquisition of intensity data used to assess the object. If the intensity data acquired during the interacquisition timeslots varies from expected, an anomalous condition may be deemed to have occurred.

Responsive to the results of the user assessment, the device may proceed to perform operations, such as acquiring input. The input may comprise sensor data that is representative of non-biometric input, biometric input, or both. The non-biometric input may comprise data from a smart card that is in communication with a card reader of the device, image data such as a visible light image of a barcode, and so forth.

The biometric input may comprise images that may be used for non-contact biometric identification of users. The input device may include a distance sensor, such as an optical time-of-flight sensor. When the distance sensor detects a presence of an object, one or more operations may be performed by the device.

The device may include a visible light camera. In one implementation, the visible light camera may be used to acquire visible light image data of the hand. The visible light image data may be used to determine information about the pose of the hand. This information may be used to provide feedback to the user, directing them to modify the pose of their hand to attain a pose that is suitable for identification.

Biometric input may comprise images acquired by an infrared camera. In one implementation, polarized infrared light sources in the device may be activated at different times to provide illumination while an infrared camera in the device that is sensitive to infrared light acquires images at the different times. The images are of objects within the camera's field of view (FOV) and as illuminated by infrared light with different polarizations at different times. For example, a first set of one or more images may be obtained that use infrared light with a first polarization and a second set of one or more images that use infrared light with a second polarization. The infrared camera may include a polarizer with the first polarization. The first set of images depict external characteristics, such as lines and creases in the user's palm while the second set of images depict internal anatomical structures, such as veins, bones, soft tissue, or other structures beneath the epidermis of the skin.

The biometric input may then be processed to determine information indicative of features in the images. In one implementation the biometric input may be processed at least in part locally on the device. In another implementation the biometric input, or data based on the biometric input, may be encrypted and transmitted to a server for processing to determine identity, payment account information, authorization to pass through a portal, and so forth.

The device may include output devices. In one implementation the one or more visible light sources may be used to provide output to the user. A light emitting diode (LED) that emits visible light may be operated to provide a visual indication to the user that data acquisition was successful or unsuccessful, to provide positioning prompts, and so forth. For example, as the user moves their hand into the FOV, the visible light LED may be illuminated blue, providing a visible indicator to the user that their hand is within the FOV. In another example, after successful image acquisition, the visible light LED may be illuminated green to provide a visible indicator to the user that usable images of their hand have been acquired. As mentioned earlier, the visible light sources may be used in conjunction with the photodetector to characterize the object in the FOV.

The device may include other output devices, such as a display, speaker, printer, and so forth. For example, a display screen may be used to provide information to the user such as prompting positioning of the hand, indicating acquisition of images was successful, approval or denial of a transaction, and so forth.

The device may include other input devices, such as a card reader, touch sensor, button, microphone, and so forth. The card reader may comprise a smart card reader that provides wired or wireless communication with a smart card such as an EMV card. For example, the user may insert an EMV card which, along with the images obtained by the sensor assembly, is used to authorize a transaction. In another example, the card reader may comprise a contactless card reader that acquires information from corresponding circuitry with a smartphone, fob, or other device. The touch sensor may be combined with the display screen to provide a touchscreen. The user may provide input by touching the touchscreen.

By assessing the object in the field of view of the device as described, vulnerability from presentation attacks is substantially reduced. The system provides a high degree of assurance that the biometric input is associated with an actual person, and not a constructed artifact. In the event an artifact is determined to be present, mitigating actions may be taken. For example, the device may be disabled for a period of time, issue an alarm notification, erase data stored in internal memory, perform one or more anti-tampering functions, and so forth.

The device is compact, allowing easy integration with existing or new systems. The device facilitates rapid acquisition of input in a variety of situations. The device is easily deployed, and different implementations may be used as a portable device, placed on a supporting structure, affixed to a stand, integrated with another device, and so forth. By assessing the user and using the biometric input acquired by the device, a computer system is able to determine the physical presence of a particular user at the particular device at a particular time. This information may be used to authorize payment of a transaction, gain entry to a secured area, sign a contract, and so forth.

Illustrative System

Figure 1:
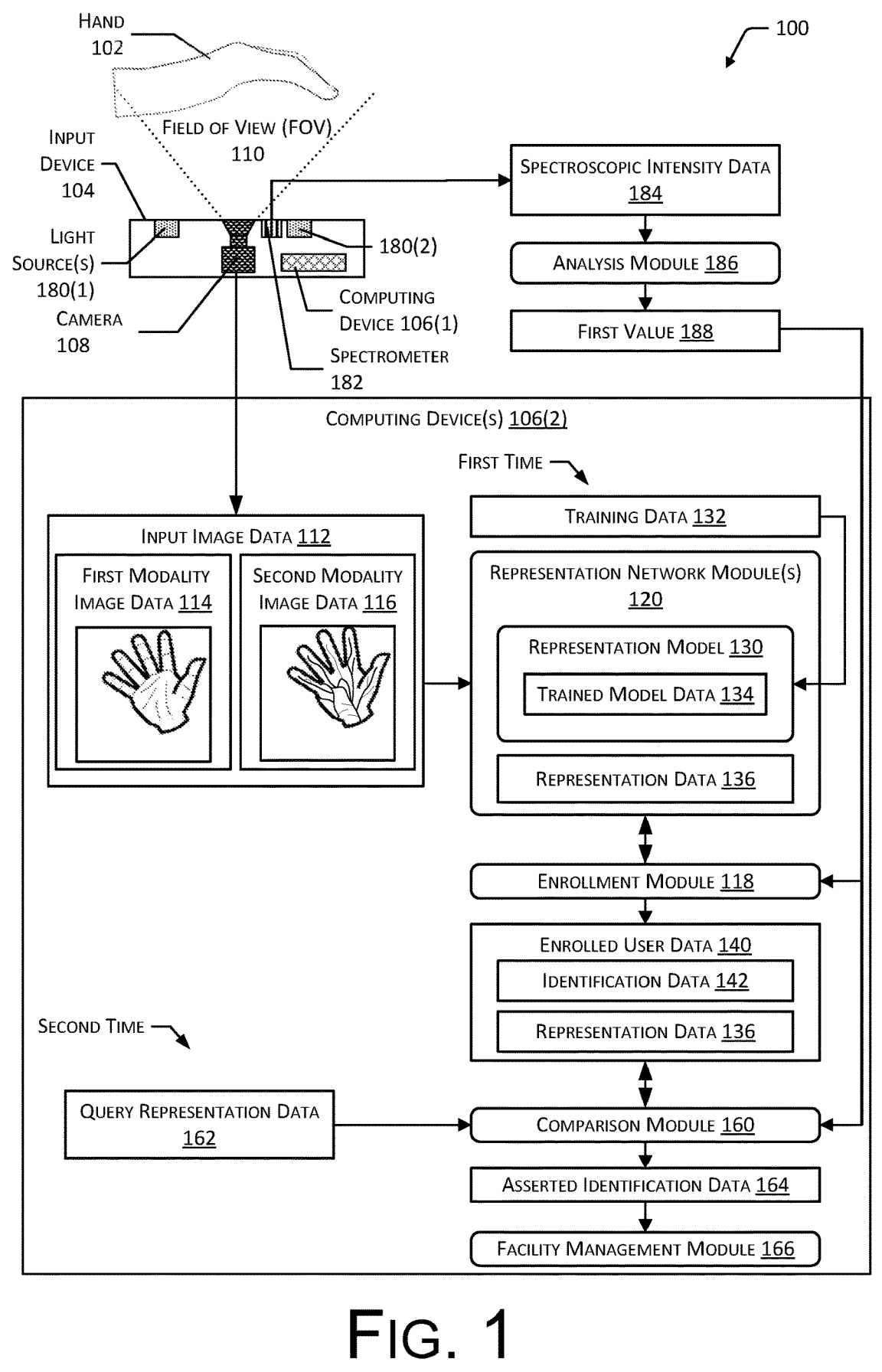

FIG. 1 illustrates a system 100 to provide spectroscopic biometric user assessment, according to some implementations. The system 100 is described performing biometric identification that asserts an identity of a user at an input device 104. However, the system and techniques described herein may be used in other situations.

A hand 102 of a user is depicted positioned above an input device 104. The input device 104 may include a computing device 106(1) and a camera 108. The camera 108 has a field of view (FOV) 110. During operation of the input device 104, the camera 108 acquires images of an object in the FOV 110, such as the hand 102, and provides input image data 112. The camera 108 may be sensitive to one or more of visible light, infrared light, or ultraviolet light. The input device 104 includes one or more light sources 180 that illuminate the object in the FOV 110.

During operation, the light sources 180 emit light at a plurality of wavelengths. For example, a first light source 180(1) may emit white light, a second light source 180(2) may emit infrared light, a third light source 180(3) (not shown) may emit violet light, and so forth.

The input device 104 also includes a spectrometer 182 capable of integrating intensity data for a plurality of wavelengths during a single interval of time. During operation, the spectrometer 182 provides as output spectroscopic intensity data 184 that is indicative of the respective intensity values for individual ones of the wavelengths integrated by the spectrometer 182.

In some implementations, a distance between the spectrometer 182 and the camera 108 may be arranged such that there is a distance D1 between them. Likewise, the spectrometer 182 and a nearest light source 180 for at least a particular wavelength may be arranged such that there is a distance D2 between them. These distances may increase the difficulty associated with providing false data to the input device 104. In one implementation, output from the spectrometer 182 may be used to determine whether the object in the FOV 110 is living tissue or a fabricated artifact such as a casting of a hand. The distance D2 in particular results in the sensor data from the spectrometer 182 being associated with a larger volume of the FOV 110. For example, the spectrometer 182 may be mounted at least one centimeter from any of the light sources 180 that are used in conjunction with the spectrometer 182. In this example, an object within the FOV 110 that is being assessed based on the output from the spectrometer 182 would need to be illuminated by the light source(s) 180. However, the distance D2 prevents an attempt to subvert this determination. Continuing the example, placement of living tissue such as a thumb directly over the spectrometer 182 would fail as that thumb would not be illuminated with a particular wavelength by the light source(s) 180. Trying to hold the thumb far enough from the spectrometer 182 to produce suitable output would then result in the thumb itself occluding part of the FOV 110, occluding the camera's 108 view of the fabricated artifact. As a result, distance D2 improves the ability of the input device 104 to resist attempts to present false input. The light sources 180 and the spectrometer 182 are discussed in more detail with regard to FIG. 2.

An analysis module 186 accepts as input the spectroscopic intensity data 184 and determines a first value 188. In one implementation, the spectroscopic intensity data 184 is used to determine ratio data indicative of relative intensities of different pairs of wavelengths measured by the spectrometer 182. The ratio data is then assessed to determine the first value 188. In another implementation, the spectroscopic intensity data 184 may be processed by a trained machine learning system to determine the first value 188. In one implementation, the first value 188 is indicative of whether the object within the FOV 110 is deemed to be an actual user or an artifact. Operation of the analysis module 186 to determine the first value 188 is described in more detail with regard to FIGS. 3-7. The first value 188 may be subsequently provided to other portions of the system 100 for use, such as an enrollment module 118, a comparison module 160, or other modules as described below.

The input device 104 may include other components which are not shown. For example, the input device 104 may include tamper detection devices.

In the implementation depicted, the hand 102 is held above the camera 108, with the FOV 110 extending upward.

In other implementations, other configurations may be used. For example, the camera 108 may have the FOV 110 extending downwards, and the user may place their hand 102 in the FOV 110 under the input device 104.

In one implementation, the input device 104 is configured to acquire images of the hand 102 that are illuminated using infrared light source(s) 180 that have two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared light sources 180.

Depending upon the polarization used, the images produced by the input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by the infrared light sources 180. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

In the implementation depicted here, the input device 104 does not include a hood, cover, or other structure that blocks at least a portion of the ambient light from reaching one or more of the camera 108 or the spectrometer 182. The omission of the hood may improve usability and accessibility of the system by users. For example, by omitting the hood, the user's hand 102 may be moved in any direction with respect to the input device 104 to bring the hand 102 into the FOV 110. In contrast, a hood and associated support structure would limit the directions, relative to the input device 104, that the user may present their hand 102. By utilizing the techniques and hardware described in this disclosure, the input device 104 may be used in locations such as outdoors, indoors within areas that are exposed to sunlight such as near windows, in the presence of high intensity artificial illumination, and so forth. The system is also able to provide intensity data in the presence of ambient lighting with different color temperatures.

Users are able to utilize the system 100 by performing an enrollment process. An enrollment module 118 may coordinate the enrollment process. Enrollment may associate biometric information, such as representation data or transformed representation data, with particular information such as a name, account number, and so forth.

During an enrollment process, the user opts in and presents their hand 102 to the input device 104. The input device 104 determines the first value 188. In some implementations, based on the first value 188 various actions may be taken. For example, if the first value 188 indicates an actual hand is present, the input device 104 may then provide input image data 112 to a computing device 106(2) executing a representation network module 120. Continuing the example, the computing device 106(1) of the input device 104 may generate an error and present an error notification using an output device. In another example, the first value 188 and the input image data 112 may be provided to the computing device 106(2) regardless of the value of the first value 188.

The representation network module 120 may comprise a neural network implementing one or more representation models 130 ("representation model") that accepts as input the input image data 112 and provides as output representation data 136. The representation model 130 comprises a machine learning network ("network") that is trained to determine representation data 136 based on input image data 112. The network may comprise a convolutional neural network, deep learning network, or other network architecture. The representation data 136 is representative of at least some of the features depicted in the input image data 112. In some implementations, the representation data 136 may comprise a vector value in an embedding space.

In some implementations, the computing device 106(1) of the input device 104 may include and may execute the (trained) representation network module(s) 120. In another implementation, the input device 104 may encrypt and send the input image data 112 or data based thereon, the first value 188, or other data to another computing device 106(2) such as a server.

During the enrollment process, the submitted representation data 136 may be checked to determine whether the user has been previously enrolled. A successful enrollment may comprise storage of identification data 142, such as name, telephone number, account number, and so forth and storage of one or more of the representation data 136 or the transformed representation data as enrolled user data 140. In some implementations, the enrolled user data 140 may comprise additional information associated with processing of the input image data 112 with a representation model 130. For example, the enrolled user data 140 may comprise intermediate layer data, such as the values of a penultimate layer of the representation model 130.

In this illustration, at a first time the representation model 130 is trained using training data 132 to determine trained model data 134. The training data 132 may comprise a plurality of first modality and second modality images that have been labeled. For example, label data may indicate the sample identifier, identity label, modality label, and so forth.

During subsequent usage, such as at a second time, the (as yet unidentified) user presents their hand 102 at an input device 104. As described above with regard to enrollment, the input device 104 determines the first value 188. In some implementations, based on the first value 188 various actions may be taken. For example, if the first value 188 indicates an actual hand is present, the input device 104 may then provide input image data 112 to the computing device 106(2) for further processing. Continuing the example, the computing device 106(1) of the input device 104 may generate an error and present an error notification using an output device. In another example, the first value 188 and the input image data 112 may be provided to the computing device 106(2) regardless of the value of the first value 188.

The resulting query input image data 112 may be processed by the (now trained) representation model 130 to determine query representation data 162.

The comparison module 160 compares the query representation data 162 to the representation data 136 stored in the enrolled user data 140 to determine asserted identification data 164. In one implementation, the asserted identification data 164 may comprise a user identifier associated with the closest previously stored representation data 136 in the enrolled user data 140 to the query representation data 162 associated with the user who presented their hand 102. The comparison module 160 may utilize other considerations, such as requiring that the query representation data 162 is no more than a maximum distance in the representation space from the representation data 136 of a particular user before determining the asserted identification data 164. In some implementations the asserted identification data 164 may include the first value 188 or information based thereon. For example, if the first value 188 indicates that the input image data 112 is associated with an artifact, the asserted identification data 164 may be indicative of this.

The asserted identification data 164 may then be used by subsequent systems or modules. For example, if the first value 188 indicates the input image data 112 is associated with a real hand, the asserted identification data 164, or information based thereon, may be provided to a facility management module 166. In another example, if the first value 188 indicates the input image data 112 is associated with an artifact, the system 100 may provide a request for additional information at the input device 104, create an entry in an error log, flag the asserted identification 164 as potentially compromised, and so forth.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the input device 104, the user identity indicated in the identification data 142 may be associated with the user as they use the facility. For example, the now identified user may walk to a shelf, remove an item, and leave the facility. The facility management module 166 may determine the interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

FIG. 2 illustrates at 200 the input device 104 comprising the light sources 180, the spectrometer 182, and other possible components, according to some implementations. As with FIG. 1, the hand 102 is shown within the FOV 110. A side view is shown of the input device 104 overall, while a plan view of the spectrometer 182 and light sources 180 is also shown.

The one or more light sources 180 emit light during operation. For example, the light sources 180 may comprise light emitting diodes (LEDs), quantum dots, electroluminescent devices, fluorescent devices, lamps, vertical-cavity surface-emitting lasers (VCSELs), and so forth. The light sources 180 may be arranged to provide illumination of an object within the FOV 110. For example, a plurality of the light sources 180 may be arranged on a circuit board around the camera 108, spectrometer 182, and so forth.

The side view illustrates one implementation in which one or more optical elements 262 are present in the optical path of one or more of the spectrometer 182 or the light sources 180. The optical elements 262 may comprise one or more of a diffuser, polarizer, lens, grating (such as a diffraction grating), wavelength or color filter, light guide, or other device.

In one implementation a polarizer may be emplaced that filters light emitted by the light source 180. A polarizer having the same or a different polarization relative to the light sources 180 may be emplaced that filters light before impingement on the spectrometer 182. As described with regard to the different modalities, by utilizing different combinations of polarization the spectrometer 182 may be used to assess light reflected predominately from a surface of the object, or from deeper within the object.

A diffuser may be emplaced that diffuses light emitted by the light source 180. A light pipe or other waveguide may be emplaced that directs light from the light source 180 toward the FOV 110. For example, the light pipe or other structure may be used to provide a desired distribution of intensity across the FOV 110.

As shown in this illustration, the light sources 180 are able to emit light with a plurality of wavelengths. The light sources 180 may comprise different devices, each with different emitted light characteristics such as emitted wavelengths. The light sources 180 may comprise one or more of infrared light sources 232 to emit infrared light, visible light sources 234 to emit visible light, ultraviolet light sources (not shown) to emit ultraviolet light, and so forth. The infrared light sources 232 emit infrared light, such as light with a wavelength of 940 nm. The visible light sources 234 may comprise one or more of a white light source 244, a violet light source 246, or other colors of light sources.

Some of the light sources 180 may be monochromatic or may emit light within a relatively narrow band of wavelengths such as 10 nm. For ease of discussion, and not necessarily as a limitation, unless otherwise specified, a wavelength may include either a single wavelength or a range of wavelengths. For example, a VCSEL described as emitting light with a wavelength of 940 nm may emit infrared light between 935 nm and 945 nm, with a peak intensity at 940 nm.

Some light sources 180 may be relatively broadband, such as the white light source 244 that emits white light. Broadband light sources 180 may comprise relatively broadband devices, such as incandescent filament, or may comprise several different devices that emit narrower bandwidths, such as a combination of red, green, and blue LEDS. White light may comprise light with a color temperature of 5000 degrees Kelvin and comprises visible light wavelengths and having relative intensities at wavelengths therein that are perceived by the human eye as being white.

The violet light source 246 may emit light at a wavelength of 415 nm. In some implementations the white light sources 244 may also emit light at 415 nm. In this implementation, the discrete violet light source 246, such as a violet LED, may be omitted and the violet light emitted by the white light source 244 may be utilized.

The spectrometer 182 comprises a multichannel device, with each channel associated with a particular wavelength or range of wavelengths. The spectrometer 182 is capable of integrating intensity data for a plurality of different channels during the same time interval. For example, the spectrometer 182 may determine intensity data for six channels during the same time interval. The spectrometer 182 may comprise a single-chip device that provides spectroscopic intensity data 184 as output. For example, the spectrometer 182 may comprise the AS7341L "10-channel Spectral Sensor Frontend" produced by ams AG of Austria.

In one implementation, the spectrometer 182 may utilize a plurality of detectors or other devices that are sensitive to particular wavelengths. For example, a first channel may comprise a photodiode sensitive to 415 nm light and not other wavelengths such as 445 nm.

In another implementation, such as shown in FIG. 2, the spectrometer 182 may utilize a plurality of filtered detectors, each comprising a wavelength filter and a detector such as a photodiode. The wavelength filter is selected to pass the wavelength of interest, or a narrowband range of wavelengths associated with the wavelength of interest. For example, the filter may have a bandwidth of between 3 and 60 nm. Incident light that passes through the wavelength filter impinges on the detector and provides data for a channel associated with that wavelength.

In the implementation shown a first set of filtered visible wavelength detectors 210(1), 210(2), . . . , 210(8) are shown. While eight filtered visible wavelength detectors 210 are depicted, other numbers may be used. For example, the spectrometer 182 may only comprise six visible light channels, twelve visible light channels, and so forth.

During operation, each of these filtered visible wavelength detectors 210 provides intensity data indicative of a different wavelength corresponding to the filter used. For example, the first filtered visible wavelength detector 210(1) may determine intensity data of incident light with a wavelength of 415 nm, a second filtered visible wavelength detector 210(2) may determine intensity data of incident light with a wavelength of 445 nm, a third filtered visible wavelength detector 210(3) may determine intensity data of incident light with a wavelength of 480 nm, a fourth filtered visible wavelength detector 210(4) may determine intensity data of incident light with a wavelength of 515 nm, a fifth filtered visible wavelength detector 210(5) may determine intensity data of incident light with a wavelength of 555 nm, a sixth filtered visible wavelength detector 210(6) may determine intensity data of incident light with a wavelength of 590 nm, a seventh filtered visible wavelength detector 210(7) may determine intensity data of incident light with a wavelength of 630 nm, an eighth filtered visible wavelength detector 210(8) may determine intensity data of incident light with a wavelength of 680 nm, and so forth.

The spectrometer 182 may comprise an unfiltered detector 212(1) or "clear" channel that comprises a detector, such as a photodetector without an intervening filter.

The spectrometer 182 may comprise one or more filtered infrared wavelength detectors 214(1). During operation, each of these filtered infrared wavelength detectors 214 provides intensity data indicative of a different wavelength corresponding to the filter used. For example, a first filtered infrared wavelength detector 214(1) may determine intensity data of incident light with a wavelength of 940 nm. While one filtered infrared wavelength detector 214 is depicted, other numbers may be used. For example, in some implementations the spectrometer 182 may comprise a single infrared light channel, or may comprise six infrared light channels.

The spectrometer 182 may comprise an unfiltered infrared detector (not shown) or "clear infrared" that comprises a broadband infrared detector, such as a photodetector, without an intervening filter.

In some implementations, the spectrometer 182 may comprise a plurality of detectors associated with the same channel. For example, the spectrometer may comprise a quantity of two of the first filtered visible wavelength detectors 210(1). In such implementations, the individual instances of the detectors may be spatially separated. For example, the first instance of the first filtered visible wavelength detector 210(1) may be located on a left side of a circuit board while the second instance of the first filtered visible wavelength detector 210(1) may be located on the right side. The spectroscopic intensity data 184 may be based on the output of the detectors associated with the same channel or wavelengths.

In some implementations, the spectrometer 182 may comprise a plurality of detectors and an optical element such as a diffraction grating, prism, and so forth that distributes particular wavelengths of light onto a particular portion of the plurality of detectors. For example, the spectrometer 182 may comprise a linear detector array and a diffraction element. Continuing the example, the spectrometer 182 may comprise the C12666MA "Mini-spectrometer" produced by Hamamatsu Photonics K.K. of Japan.

The spectrometer 182 provides for concurrent data acquisition for a plurality of different channels and their associated wavelengths. For example, the spectrometer 182 may concurrently acquire intensity data for incident light at 415 nm, 445 nm, 480 nm, 515 nm, . . . , and 940 nm. Operation of the light sources 180 is coordinated to provide illumination at the wavelengths being acquired during data acquisition. Because the spectrometer 182 acquires intensity data for a plurality of different wavelengths during the same time interval, the illumination used may be polychromatic. For example, the object may be illuminated with white, violet, and infrared light simultaneously while the spectrometer 182 acquires intensity data for a plurality of wavelengths such as 415 nm, 555 nm, and 940 nm.

Figure 3:
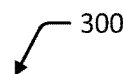
FIGS. 3 and 4 illustrate sample wavelengths, and timeslots when intensity data is acquired and light sources are activated, according to some implementations.
Figure 3:
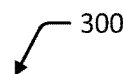
Figure 4:
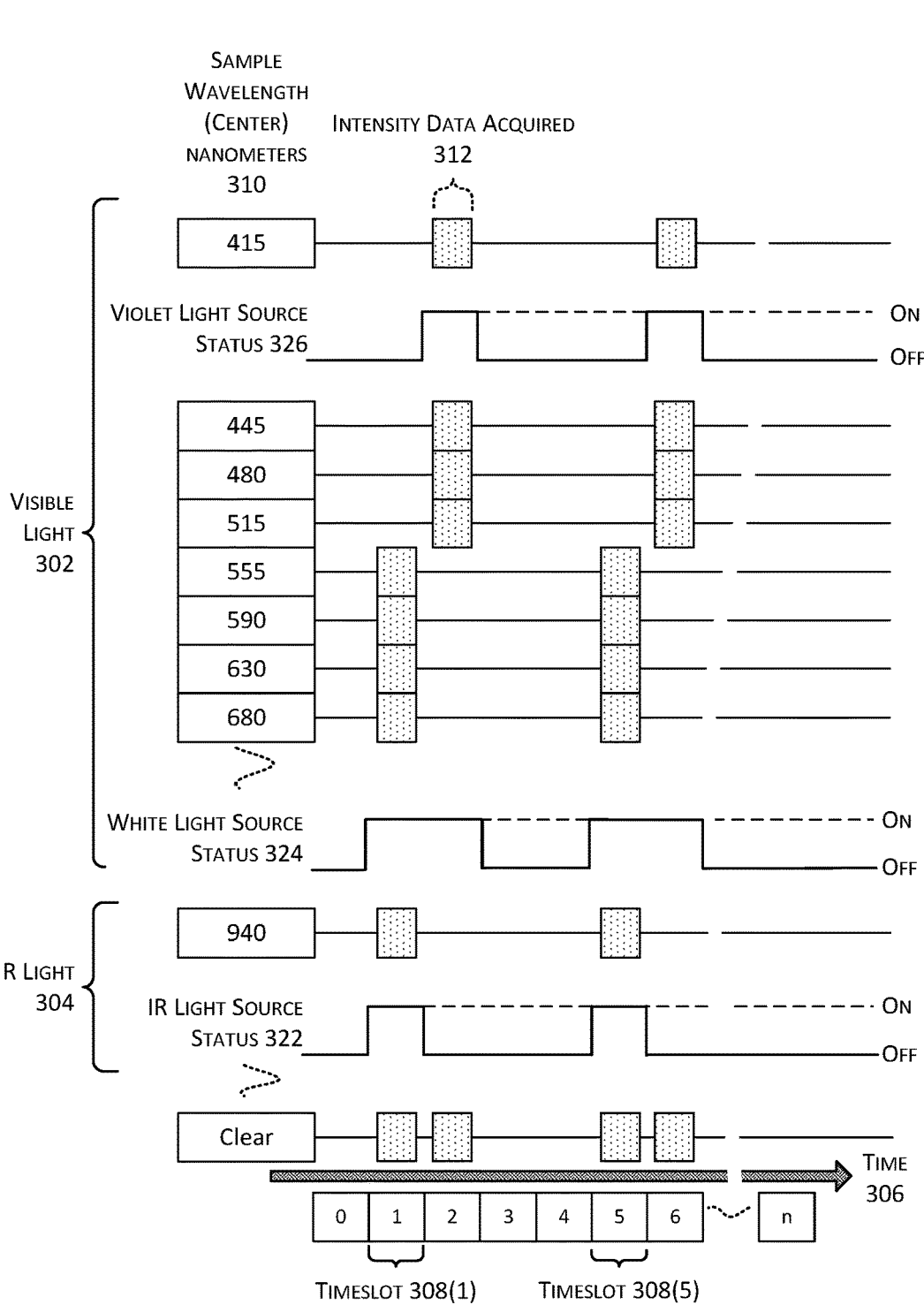

FIGS. 3 and 4 illustrate sample wavelengths, and timeslots when intensity data is acquired and light sources are activated, according to some implementations.

In these figures, visible light 302 is depicted as comprising sample wavelengths 310 from 415 nm to 680 nm. In other implementations, a different range of wavelengths may be used. In other implementations, other wavelengths within the visible light 302 may be used.

During operation, the visible light sources 234 illuminate the FOV 110. The operation of these light sources is indicated by the corresponding source status in these figures. A violet light source status 326 indicates whether the violet light source 246 that emits light at 415 nm is on (emitting light) or off (not emitting light). A white light source status 324 indicates whether the white light source 244 that emits light with wavelengths of 445 nm to 680 nm is on (emitting light) or off (not emitting light). It is understood that in other implementations, other light sources with different emission wavelengths may be used, such as individual red, green, and blue light sources operated to produce white light.

These figures also depict infrared (IR) light 304, including 940 nm light. In other implementations, other infrared wavelengths may be used instead of, or in addition to, 940 nm. An IR light source status 322 indicates whether the infrared light source 232 that emits light at 415 nm is on (emitting light) or off (not emitting light).

In FIGS. 3 and 4, time 306 is depicted on a horizontal axis, increasing from left to right. As mentioned earlier, the vertical axis indicates different sample wavelengths 310 of light corresponding to at least some of the channels of the spectrometer 182.

A set of timeslots 308(1), 308(2), . . . , 308(n) are depicted. Each timeslot 308 comprises a specified time interval. In one implementation the duration of timeslots 308 may be the same. For example, each timeslot 308 may have a duration of 50 milliseconds (ms).

In another implementation the duration of timeslots 308 may vary. For example (not shown), timeslot 308(1) may have a greater duration than timeslot 308(3). In some implementations, the duration of the timeslots 308 may be randomly or pseudo-randomly determined. This variation in duration between timeslots 308 may increase the difficulty for a potential adversary who is attempting to spoof the system by attempting to illuminate the spectrometer 182.

The graphs also depict times during which intensity data is acquired 312 for respective sample wavelengths 310. During these times, the spectrometer 182 is operated to determine the spectroscopic intensity data 184 for the corresponding sample wavelength 310 indicated by the graph.

As mentioned above, the graphs depict light source status. This indicates when the respective light source 180 is operated to emit light that includes the sample wavelength 310 associated with the timeslot 308. The operation of the light sources 180 and the spectrometer 182 are thus coordinated, such that the FOV 110 is illuminated with a first plurality of wavelengths of light during acquisition of the spectroscopic intensity data 184. During acquisition of the spectroscopic intensity data 184, the spectrometer 182 is acquiring intensity data with respect to a second plurality of wavelengths of light. The second plurality of wavelengths is a subset of the first plurality of wavelengths. For example, the illumination provided by the light sources 180 may include wavelengths that are not detected or otherwise acquired by the spectrometer 182.

The graphs also depict an interacquisition interval 332. The interacquisition interval 332 may comprise a time interval between instances of spectroscopic intensity data

184 acquisition. For example, the interacquisition interval 332 may be the time from the end of the first timeslot 308(1) to the beginning of the fifth timeslot 308(5) as depicted in FIG. 3.

In one implementation the duration of interacquisition intervals 332 may be the same. For example, the interacquisition interval 332 between successive instances of acquiring spectroscopic intensity data 184 may have a duration of 150 ms.

In another implementation the duration of interacquisition intervals 332 may vary. For example (not shown), a first interacquisition time interval 332(1) between timeslots 308 (1) and 308(5) may be three timeslots as shown, while a second interacquisition time interval 332(2) between timeslots 308(5) and 308(17) may be eleven timeslots. In some implementations, the duration of the interacquisition intervals 332 may be randomly or pseudo-randomly determined. This variation in duration between interacquisition intervals 332 may increase the difficulty for a potential adversary who is attempting to spoof the system by attempting to illuminate the spectrometer 182.

FIG. 3 depicts at 300 a first implementation in which the spectrometer 182 supports integration of all available channels during a single time interval. In this implementation, during timeslots 308(1) and 308(5) respective instances of intensity data are acquired 312 for all available sample wavelengths 310. During these timeslots 308(1) and 308(5) the visible light sources 234 and infrared light sources 232 are "on", emitting light in their respective wavelengths. While not depicted, the light sources 180 may be operated at other times. For example, the white light sources 244 may be operated continuously.

In some implementations, additional intensity data may be acquired (not shown) while the light sources 180 are not emitting light. For example, background intensity data may comprise intensity data that is acquired while the light sources 180 are not being operated to emit light. Continuing the example, background intensity data may be acquired during timeslot 308(2), 308(6), and so forth. In some implementations, the intensity data included in the spectroscopic intensity data 184 may be based on a difference between the intensity data acquired 312 during illumination and the background intensity data.

FIG. 4 depicts at 400 a second implementation in which data acquisition by the spectrometer 182 is performed during two or more time intervals. For example, the spectrometer 182 may be limited to only providing output for less than all channels at any given time.

In this implementation, during timeslots 308(1) and 308 (5) respective instances of intensity data are acquired 312 for a first set of sample wavelengths 310. During timeslots 308(2) and 308(6) respective instances of intensity data are acquired 312 for a second set of sample wavelengths 310.

Corresponding light sources 180 are operated to illuminate the FOV 110 with the wavelengths being acquired. In this graph, only the violet light source 246 is on and emitting violet light during timeslots 308(2) and 308(6) during which times the spectrometer 182 is acquiring intensity data for the corresponding sample wavelength 310 of 415 nm.

Similarly, only the infrared light source 232 is on and emitting infrared light during timeslots 308(1) and 308(5) during which times the spectrometer 182 is acquiring intensity data for the corresponding sample wavelength 310 of 940 nm.

The input device 104 may utilize other techniques to prevent spoofing. In one implementation, the output intensity of the light sources 180 used during different timeslots

308 associated with intensity data acquisition 312 may be varied from time to time. For example, during a timeslot 308(1) the light sources may be operated with a first output intensity while during a timeslot 308(5) the light sources are operated with a second output intensity that differs from the first output intensity. A spoof may be deemed to have occurred based on a comparison of output intensity used and the actual intensity as measured. For example, a differential value may be determined based on the output intensity and the intensity data. If the differential value is outside of a threshold range, a spoof may be deemed to have occurred. In other implementations, other comparisons may be performed. For example, if the intensity indicated by the intensity data exceeds a threshold maximum value, a spoof may be deemed to have occurred. This may comprise an intensity at one or more individual sample wavelengths 310, an aggregate intensity across a plurality of sample wavelengths 310, and so forth.

Figure 5:
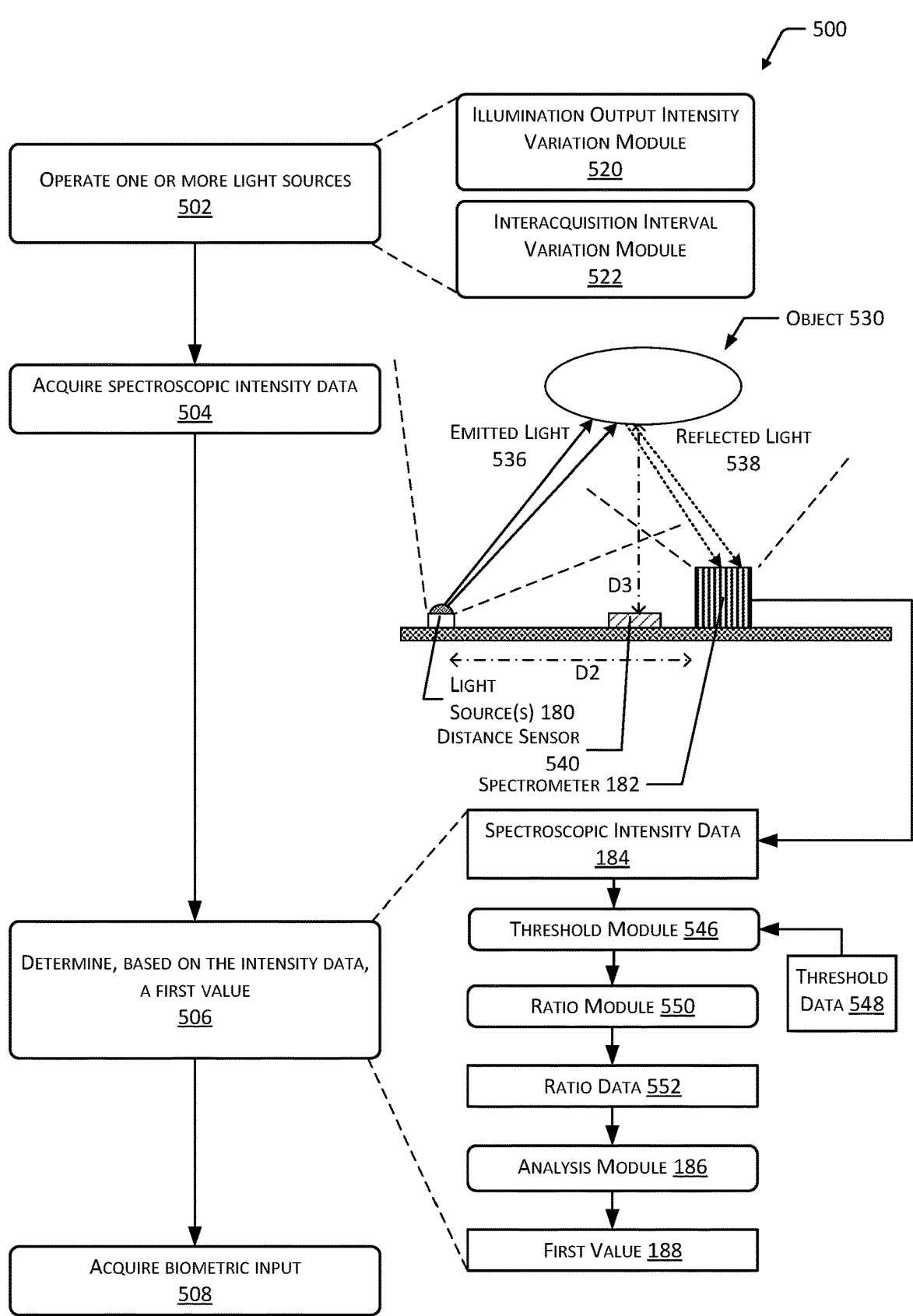
FIG. 5 is a flow diagram of a process to assess a user, according to some implementations.

FIG. 5 is a flow diagram 500 of a process to assess a user, according to some implementations. In some implementations the process may be implemented by the input device 104.

At 502 one or more light sources 180 are operated to illuminate the FOV 110 with emitted light 536 comprising a first plurality of wavelengths of light. For example, the infrared light sources 232 and the visible light sources 234 may be operated at the same time to illuminate the FOV 110. The emitted light 536 interacts with and may be reflected by the object 530 as reflected light 538.

In one implementation brightness of the one or more light sources 180 remains fixed during a timeslot 308. For example, the one or more light sources 180 may be operated with a brightness level that produces maximum light output.

In some implementations, brightness of the emitted light 536 from the one or more light sources 180 may be based on distance data provided by the distance sensor 540 that is indicative of distance D3 between an object 530 and the distance sensor 540. For example, brightness level may be determined based on the distance data. The one or more light sources 180 are then operated according to the brightness level. As the distance increases, the brightness level and corresponding brightness of the one or more light sources 180 may be increased. An increase in brightness results in increased emission of photons per unit of time. By controlling the brightness of the one or more light sources 180 (or other light sources), a particular optical power per unit area of the object 530 may be obtained. By obtaining a particular optical power per unit area of the object 530, and dynamically adjusting the brightness to account for variations in distance D3, the overall quality of spectroscopic intensity data 184 is improved, improving the accuracy of the resulting determination as to whether the user is present.

At 504 spectroscopic intensity data 184 is acquired by the spectrometer 182. For example, the spectrometer 182 determines the intensity of the reflected light 538 for a plurality of respective sample wavelengths 310 or channels acquired during a timeslot 308 and provides as output a set of intensity data indicative of the intensity for the respective sample wavelengths 310.

In some implementations, a calibration process (not shown) may be performed before use. For example, calibration may be performed using an object comprising a color calibrated material, or a material with a known reflectance such as SPECTRALON by Labsphere, Inc.

Using the hardware and techniques described, the input device 104 is able to determine the spectroscopic intensity data 184 under a variety of different ambient lighting conditions. Ambient lighting may vary in wavelength composition, color temperature, illumination level, and so forth. For example, the system may be used to acquire the spectroscopic intensity data 184 in ambient lightning ranging from dim to several times that of solar illumination. As a result, the input device 104 may be used outdoors, indoors within areas that are exposed to sunlight such as near windows, in the presence of high intensity artificial illumination, and so forth.

Returning to 502, the one or more light sources 180 may be operated to change the output intensity of the illumination, change the interacquisition intervals 332 between successive instances of data acquisition, and so forth. An illumination output intensity variation module 520 may vary the intensity of one or more of the light sources 180 during operation. This may include modifying the intensity for all wavelengths or for particular wavelengths. For example, all light sources 180 may be set to a specified output intensity, or the violet light source 246 may be set to a first intensity and the white light source 244 may be set to a second intensity. As described above, if the intensity data acquired during a specific timeslot 308 is indicative of an intensity that does not correspond to the output intensity used during that specific timeslot 308, an anomalous condition such as a spoof may be deemed to have occurred. In some implementations, the specified output intensity for light sources 180 emitting a particular wavelength may be set to zero. Other light sources 180 may continue to emit a plurality of wavelengths. For example, the violet light source 246 may be inactive and not emitting light while the white light source 244 and the infrared light source 232 are operating.

In some implementations, the output intensity of one or more the light sources 180 may be confirmed or determined based on a measurement of electrical current used by the one or more light sources 180 during operation. An anomalous condition may be deemed to have occurred if the intensity of incident light as measured by the spectrometer 182 exceeds an expected intensity based on the electrical current drawn by the one or more light sources 180 and their respective operating wavelengths.

An interacquisition interval variation module 522 may vary the interacquisition interval 332 between instances of data acquisition by the spectrometer 182. For example, a first interacquisition interval 332 may be 3 timeslots in duration while a second interacquisition interval 332 is 5 timeslots in duration.

Depending upon the composition of the object 530, different intensities of reflected light 538 will be produced. For example, molecules in human tissue such as hemoglobin, melanin, lipids, and so forth reflect light of different colors differently than other molecules such as silicone, dyes, and so forth.

At 506, based on the spectroscopic intensity data 184, the first value 188 is determined. The first value 188 is indicative of an assessment of the object 530. For example, the first value 188 may indicate that a user is deemed to be an actual hand 102 and present, or that an artifact has been presented and no user is deemed to be present. The first value 188 may be considered an indication of "liveness", indicating whether an actual person is present at the input device 104 at the time the spectroscopic intensity data 184 was acquired.

In some implementations, a threshold module 546 may assess the spectroscopic intensity data 184 before further processing. The threshold module 546 may comprise the spectroscopic intensity data 184 or information therein with one or more thresholds specified by threshold data 548. In one implementation, a minimum count of samples of intensity data may be specified by the threshold data 548. If the count of samples in the spectroscopic intensity data 184 is less than the threshold minimum count of samples of intensity data, the process may stop. In contrast, if the count of samples in the spectroscopic intensity data 184 is greater than or equal to the threshold minimum count of samples of intensity data, the process may proceed to 550.

In another implementation, a minimum intensity value may be specified by the threshold data 548. If the intensity value of a sample of the spectroscopic intensity data 184 is less than the threshold minimum intensity value, the sample may not be processed further. In contrast, if the intensity value of the sample of the spectroscopic intensity data 184 is greater than or equal to the threshold minimum intensity value, the process may proceed to 550. A maximum intensity value may also be specified and used in a similar fashion.

In one implementation, the spectroscopic intensity data 184 may comprise intensity values for sample wavelengths 310 that have been adjusted to account for background intensity values. In other implementations, unadjusted or "raw" intensity values for the sample wavelengths 310 may be used. The comparisons with respect to one or more of the count or intensity may be used with respect to one or more of the adjusted values or the unadjusted values.

In one implementation the first value 188 may be determined by assessing intensity ratios of various wavelengths of light. The spectroscopic intensity data 184 is indicative of the intensity values associated with different wavelengths. For example, the spectroscopic intensity data 184 may indicate infrared (940 nm) "89", green (515 nm) "7", blue (455 nm) "32", and violet (415 nm) "13".

A ratio module 550 may use the spectroscopic intensity data 184 passed by the threshold module 546 to determine ratio data 552 indicative of one or more ratio values. The ratio values may be determined by dividing a first intensity value of a first wavelength by a second intensity value of a second wavelength. In some implementations, the second wavelength may comprise a reference wavelength that is used for all ratios. For example, the reference wavelength may be one of violet (415 nm), infrared (940 nm), or other wavelength of the sample wavelengths 310.

In some implementations, a correction factor may be determined based on the distance data indicative of the distance D3 between the input device 104 and the object 530. The correction factor may be calculated, retrieved from a lookup table, and so forth. The correction factor may be used to adjust one or more of the spectroscopic intensity data 184 or ratio data 552. For example, a first uncorrected intensity value may be multiplied by a first correction factor to determine the first intensity value. In another example, a first uncorrected ratio value may be multiplied by a second correction factor to determine a first ratio value. Different correction factors may be associated with spectroscopic intensity data 184 for a particular wavelength, particular ratios, and so forth.

The analysis module 186 may process the ratio data 552 to determine the first value 188. In one implementation, each ratio value within the ratio data 552 may be compared to respective threshold values, and the output used to determine the first value 188 as illustrated in the following table:

TABLE 1

| Ratio data 552 | Ratio Value | Comparison | Threshold Value | Output |
|---|---|---|---|---|
| Infrared/Violet | 6.84 | > | 4.5 | True |
| Green/Infrared | 0.53 | < | 0.6 | True |
| Blue/Violet | 2.46 | > | 2.0 | True |
| First value 188 | — | — | — | User Present |

In the implementation shown with regard to Table 1, the outputs from the respective comparisons are combined using an AND function. If each output is true, then the first value 188 is indicative of user presence. If any of the outputs is false, the first value 188 would be indicative of no user present. In other implementations, the determination of the first value 188 may utilize other functions. For example, a weighted average of the outputs may be calculated and used to determine the first value 188.

In some implementations, the distance data indicative of distance D3 may be used to determine one or more of the threshold values for one or more of the comparisons. For example, a threshold correction factor may be retrieved from a lookup table or calculated based on the distance D3 as indicated by the distance data. The threshold value used for a comparison may comprise the product of an initial threshold value and the threshold correction factor. As the distance changes, the threshold value used for the comparison may also change.

In other implementations, other techniques may be used. For example, the analysis module 186 may utilize a classifier that uses the ratio data 552 as input to provide the first value 188 as output. In another example, a trained machine learning system may accept as input one or more of the spectroscopic intensity data 184 or the ratio data 552, and provide as output the first value 188. In other implementations, other techniques may be used instead of or in addition to analysis of ratios. For example, relative intensity values or absolute intensity values may be assessed to determine the first value 188.

In some implementations the threshold values may be adjusted. This adjustment may be performed to adjust for users with different compositions. For example, the input device 104 may acquire biometric input and determine user identity. Based on the user identity, one or more threshold values may be determined. The ratio data 552 may then be assessed using the analysis module 186 to determine the first value 188. If the first value 188 is indicative of the user presence, other actions may be taken, such as permitting authorization of a payment transaction. However, if the first value 188 is not indicative of the user presence, a presentation attack may be deemed likely, and authorization may be denied.

Other techniques may be used by the analysis module 186 to determine the first value 188. For example, the ratio data 552 may be considered coordinates indicative of a point within an n-dimensional space. Within the n-dimensional space, a first volume may be associated with user presence. The first value 188 may be determined based on whether the ratio data 552 is indicative of a point that is within the first volume. A confidence value may be determined that is indicative of a likelihood that the first value 188 is correct. In one implementation, the confidence value may be based on a distance between the coordinates of the ratio data 552 and a specified point within the n-dimensional space. For example, the closer the point described by the ratio data 552 is in the n-dimensional space to a center of the first volume, the greater the confidence value.

At 508, the process may proceed to acquire biometric input. For example, responsive to the first value 188 indicating user presence, the device 104 may operate one or more of the light sources 180, the camera 108, and so forth to acquire biometric input.

In some implementations, acquisition of biometric input may be performed even if the first value 188 is indicative of no user being present. For example, if the first value 188 is indicative of a presentation attack using an artifact, the device 104 may acquire biometric input. This biometric input may then be used to assist in the characterization and later recognition of other artifacts or attempted presentation attacks.

Figure 6:
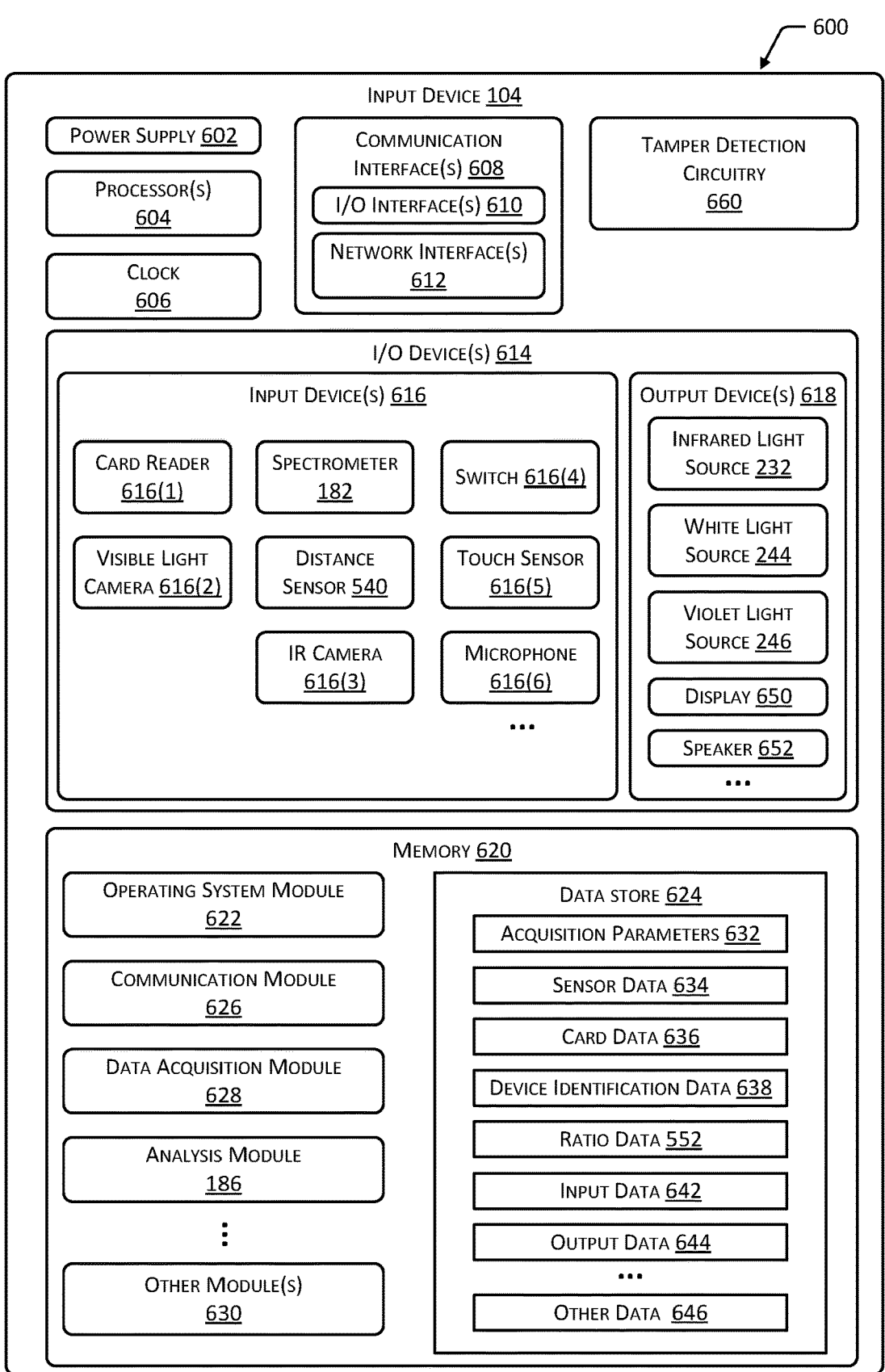
FIG. 6 is a block diagram of the input device, according to some implementations.

FIG. 6 is a block diagram 600 of the input device 104, according to some implementations.

One or more power supplies 602 are configured to provide electrical power suitable for operating the components in the input device 104. In some implementations, the power supply 602 may comprise an external power supply that is supplied by line voltage, rechargeable battery, photovoltaic cell, power conditioning circuitry, wireless power receiver, and so forth.

The input device 104 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to generate a timestamp, trigger a preprogrammed action, and so forth.

The input device 104 may include one or more communication interfaces 608 such as input/output (I/O) interfaces 610, network interfaces 612, and so forth. The communication interfaces 608 enable the input device 104, or components thereof, to communicate with other devices or components. The communication interfaces 608 may include one or more I/O interfaces 610. The I/O interfaces 610 may comprise interfaces such as Bluetooth, ZigBee, Inter-Integrated Circuit (I2C), Serial Peripheral Interface bus (SPI), Universal Serial Bus (USB) as promulgated by the USB Implementers Forum, RS-232, and so forth.

The network interfaces 612 are configured to provide communications between the input device 104 and other devices, such as access points, point-of-sale devices, payment terminals, servers, and so forth. The network interfaces 612 may include devices configured to couple to wired or wireless personal area networks (PANs), local area networks (LANs), wide area networks (WANs), and so forth. For example, the network interfaces 612 may include devices compatible with Ethernet, Wi-Fi, 5G, 6G, LTE, and so forth.

The input device 104 may also include one or more buses or other internal communications hardware or software that allow for the transfer of data between the various modules and components of the input device 104. For example, the input device 104 may use one or more Universal Serial Bus interfaces.

The input device 104 may include tamper detection circuitry 660. In one implementation, the tamper detection circuitry 660 may comprise a trusted platform module (TPM). The TPM may comprise a dedicated processor that is also powered independently of the power supply 602. For example, the TPM may be powered by a battery. The tamper detection circuitry 660 may be connected to, or receive information about the status of, one or more tamper detection devices. For example, the tamper detection circuitry 660 may be connected to a tamper mesh, one or more tamper detection switches, and so forth. If the tamper detection circuitry 660 detects a tamper event, mitigating actions including, but not limited to memory erasure, self-destruction, and so forth may be performed. For example, if the tamper detection circuitry 660 detects a break in a tamper detection cover, the cryptographic keys stored within the memory 620 may be erased.

The tamper detection circuitry 660 may store data indicative of an order of occurrence of a plurality of tamper events. For example, a first change indicative of the tamper mesh being broken at a first time may be determined. Continuing the example, a second change indicative of the tamper mesh being broken at a second time after the first time may then be determined. The tamper detection circuitry 660 may store data indicative of the order of occurrence, indicating that the first change occurred before the second change. In some implementations, mitigating actions may be determined based on the order of occurrence. For example, a first order of occurrences of tamper events may result in a first action, while a second order of occurrences of tamper events may result in a second action.

The I/O interface(s) 610 may couple to one or more I/O devices 614. The I/O devices 614 may include input devices 616 and output devices 618.

The input devices 616 may include one or more of a card reader 616(1), a visible light camera 616(2), the spectrometer 182, the distance sensor 540, or an infrared image sensor in an infrared camera 616(3). Other input devices 616 may include one or more of a switch 616(4), a touch sensor 616(5), a microphone 616(6), and so forth.

Other distance sensors 540 may be employed by the input device 104. For example, a second distance sensor 540 may be positioned on the input device 104 to detect the presence of an object outside of the FOV 110 as well. For example, the second distance sensor 540 may be arranged to detect a user as they approach the input device 104. Responsive to this detection, the input device 104 may present information on the display 650, operate the light sources 180, operate the camera 108, and so forth.

The switch 616(4) is configured to accept input from the user. The switch 616(4) may comprise mechanical, capacitive, optical, or other mechanisms. For example, the switch 616(4) may comprise mechanical switches configured to accept an applied force from a user's finger press to generate an input signal.

The touch sensor 616(5) may use resistive, capacitive, surface capacitance, projected capacitance, mutual capacitance, optical, Interpolating Force-Sensitive Resistance (IFSR), or other mechanisms to determine the position of a touch or near-touch of the user. For example, the IFSR may comprise a material configured to change electrical resistance responsive to an applied force. The location within the material of that change in electrical resistance may indicate the position of the touch. For example, the touch sensor 616(5) may be integrated with the display 650 to provide a touchscreen.

The microphone 616(6) may be configured to acquire information about sound present in the environment. In some implementations, a plurality of microphones 616(6) may be used to form a microphone array. The microphone array may implement beamforming techniques to provide for directionality of gain. For example, the gain may be directed towards the expected location of the user during operation of the input device 104.

Output devices 618 may include one or more of the visible light sources 234, the infrared light source 232, the display 650, a speaker 652, printer, haptic output device, or other devices. For example, the display 650 may be used to provide information via a graphical user interface to the user. In another example, a printer may be used to print a receipt.

In some embodiments, the I/O devices 614 may be physically incorporated with the input device 104 or may be externally placed.

The input device 104 may include one or more memories 620. The memory 620 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the input device 104. A few example functional modules are shown stored in the memory 620, although the same functionality may alternatively be implemented in hardware, firmware, or as a system on a chip (SOC).

The memory 620 may include at least one operating system (OS) module 622. The OS module 622 is configured to manage hardware resource devices such as the I/O interfaces 610, the network interfaces 612, the I/O devices 614, and provide various services to applications or modules executing on the processors 604. The OS module 622 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Washington, USA; the Android operating system from Google Corporation of Mountain View, California, USA; the iOS operating system from Apple Corporation of Cupertino, California, USA; or other operating systems.

A data store 624 may be stored in the memory 620. These modules may be executed as foreground applications, background tasks, daemons, and so forth. The modules may include one or more of a communication module 626, data acquisition module 628, the analysis module 186, or other modules 630. The data store 624 may use a flat file, database, linked list, tree, executable code, script, or other data structure to store information. In some implementations, the data store 624 or a portion of the data store 624 may be distributed across one or more other devices.

A communication module 626 may be configured to establish communications with one or more other devices. The communications may be authenticated, encrypted, and so forth. The communication module 626 may also control the communication interfaces 608.

The data acquisition module 628 is configured to acquire data from the input devices 616. One or more acquisition parameters 632 may be stored in the memory 620. The acquisition parameters 632 may specify operation of the data acquisition module 628, such as data sample rate, sample frequency, scheduling, and so forth. The data acquisition module 628 may be configured to operate the distance sensor 540, the visible light camera 616(2), the spectrometer 182, the visible light sources 234, the infrared camera 616(3), the infrared light sources 232, and so forth. For example, the data acquisition module 628 may acquire data from the distance sensor 540, infrared camera 616(3), or both to determine that an object 530 is in the FOV 110. Based on this determination, the light sources 180 may be operated with the spectrometer 182 to determine spectroscopic intensity data 184 representative of the object 530. The spectroscopic intensity data 184 may be stored as sensor data 634 in the data store 624.

The sensor data 634 may be sent to another device, processed by the processor 604, and so forth. For example, in one implementation the sensor data 634 may be processed to determine one or more features present in the image data acquired by the IR camera 616(3). Data indicative of the features may be encrypted and sent to an external device, such as a server. In the event of a tamper event detected by the tamper detection circuitry 660, the sensor data 634 may be erased.

The data acquisition module 628 may obtain data from other input devices 616. For example, card data 636 may be obtained from the card reader 616(1). The card data 636 may comprise encrypted data provided by a processor of the card reader 616(1). In the event of a tamper event detected by the tamper detection circuitry 660, the card data 636 may be erased.

Device identification data 638 may be stored in the data store 624. The device identification data 638 may provide information that is indicative of the specific input device 104. For example, the device identification data 638 may comprise a cryptographically signed digital signature. In the event of a tamper event detected by the tamper detection circuitry 660, this digital signature may be erased.

The data acquisition module 628 may store input data 642 obtained from other sensors. For example, input from a switch 616(4) or touch sensor 616(5) may be used to generate input data 642.

The other modules 630 may include a feature determination module that generates feature vectors that are representative of features present in the image data. The feature determination module may utilize one or more neural networks that accept image data as input and provide one or more feature vectors as output.

The data store 624 may store output data 644. For example, the output data 644 may comprise the feature vectors generated by processing the image data.

The other modules 630 may include a user interface module that provides a user interface using one or more of the I/O devices 614. The user interface module may be used to obtain input from the user, present information to the user, and so forth. For example, the user interface module may accept input from the user via the touch sensor 616(5) and use the visible light source(s) 234 to provide output to the user.

Other data 646 may also be stored in the data store 624.

The devices and techniques described in this disclosure may be used in a variety of settings. For example, the system may be used in conjunction with a point-of-sale (POS) device. The user may present their hand 104 to an input device 104 that is used to obtain biometric data indicative of intent and authorization to pay with an account associated with their identity. In another example, a robot may incorporate an input device 104. The robot may use the input device 104 to obtain biometric data that is then used to determine whether to deliver a parcel to the user, and based on the identification, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   one or more light sources to illuminate at least a portion of a first field of view (FOV) with light at a first plurality of wavelengths, wherein the one or more light sources comprise:
      a first light source that, when operated, emits white light,
      a second light source that, when operated, emits violet light, and
      a third light source that, when operated, emits infrared light;
   a spectrometer to determine intensity data indicative of an intensity of incident light within the first FOV for at least the first plurality of wavelengths;
   a memory, storing first computer-executable instructions; and a hardware processor to execute the first computer-executable instructions to:
      operate the one or more light sources to emit light comprising the first plurality of wavelengths;
      acquire a first set of intensity data using the spectrometer, wherein the first set of intensity data is indicative of intensity of light for each wavelength of the first plurality of wavelengths;
      determine, based on the first set of intensity data, ratio data indicative of one or more ratios of intensity values of different pairs of wavelengths of the first plurality of wavelengths, wherein the ratio data represents coordinates indicative of a point within an n-dimensional space, and wherein a first volume within the n-dimensional space is associated with user presence;
      determine a first value, wherein the first value is determined based on whether the ratio data is indicative of the point being within the first volume; and
      determine a confidence value indicative of a likelihood that the first value is correct, wherein the confidence value is determined based on a distance between the coordinates of the ratio data and a specified point within the n-dimensional space.

2. The device of claim 1, wherein the first plurality of wavelengths comprises three or more of the following:
   415 nanometers,
   555 nanometers,
   590 nanometers,
   630 nanometers,
   680 nanometers, or
   940 nanometers.

3. The device of claim 1, the spectrometer comprising:
   a first plurality of filtered detectors, each comprising a filter to pass at least one wavelength of the first plurality of wavelengths and a detector to determine intensity data of incident light passed by the filter, wherein each filter has a bandwidth between 3 and 60 nanometers; and
   at least one unfiltered detector to determine intensity data of incident light.

4. The device of claim 1, further comprising:
   an optical element within an optical path of at least a portion of the spectrometer, the optical element comprising one or more of:
      a diffuser,
      a polarizer,
      a grating, or
      a lens.

5. The device of claim 1, wherein during operation the spectrometer integrates intensity data for the first plurality of wavelengths during a first time interval.

6. The device of claim 1, the hardware processor to further execute the first computer-executable instructions to:
   operate one or more of the one or more light sources at a first output intensity during a first time interval;
   acquire the first set of intensity data during the first time interval;
   operate the one or more of the one or more light sources at a second output intensity during a second time interval; and
   acquire a second set of intensity data during the second time interval using the spectrometer.

7. The device of claim 1, the hardware processor to further execute the first computer-executable instructions to:
   operate one or more of the one or more light sources at a first output intensity during a first time interval;

acquire the first set of intensity data during the first time interval;

determine, based on the first output intensity and at least a portion of the first set of intensity data, a differential value;

determine the differential value is outside of a threshold range; and determine first data, wherein the first data is indicative of an anomalous condition.

8. The device of claim 1, the hardware processor to further execute the first computer-executable instructions to:

operate the one or more light sources at a first output intensity during a first time interval to emit the first plurality of wavelengths;

acquire the first set of intensity data during the first time interval;

operate the one or more light sources at a second output intensity during a second time interval to emit a second plurality of wavelengths, wherein the second plurality of wavelengths is a subset of the first plurality of wavelengths that omits at least one wavelength of the first plurality of wavelengths;

acquire a second set of intensity data during the second time interval using the spectrometer;

determine, based on the second output intensity and at least a portion of the second set of intensity data, a differential value;

determine the differential value is outside of a threshold range; and determine a second value, wherein the second value is indicative of an anomalous condition.

9. The device of claim 1, the hardware processor to further execute the first computer-executable instructions to:

determine that the first value indicates user presence; and acquire biometric input.

10. A method comprising:

operating one or more light sources during a first time interval to illuminate at least a portion of a first field of view (FOV) with light at a first plurality of wavelengths, wherein the one or more light sources comprise:

a first light source to emit white light, a second light source to emit violet light, and a third light source to emit infrared light, wherein two or more of the one or more light sources are operated contemporaneously;

acquiring, during the first time interval, a first set of intensity data indicative of respective intensities of incident light within the first FOV at a second plurality of wavelengths using a spectrometer, wherein:

the first set of intensity data is indicative of intensity of light for each wavelength of the second plurality of wavelengths; and the second plurality of wavelengths is a subset of the first plurality of wavelengths;

operating the one or more light sources during a second time interval to illuminate the at least the portion of the first FOV with light at the first plurality of wavelengths, wherein a first interacquisition time interval represents a time interval between an end of the first time interval and a beginning of the second time interval;

acquiring, during the second time interval, a second set of intensity data indicative of respective intensities of incident light within the first FOV at the second plurality of wavelengths using the spectrometer;

operating the one or more light sources during a third time interval to illuminate the at least the portion of the first FOV with light at the first plurality of wavelengths, wherein:

a second interacquisition time interval represents a time interval between an end of the second time interval and a beginning of the third time interval, and the first interacquisition time interval is different than the second interacquisition time interval;

acquiring, during the third time interval, a third set of intensity data indicative of respective intensities of incident light within the first FOV at the second plurality of wavelengths using the spectrometer; and determining, based on the first set of intensity data, the second set of intensity data, and the third set of intensity data, a first value indicative of whether an object within the first FOV is a user or an artifact.

11. The method of claim 10, wherein:

all of the one or more light sources are operated contemporaneously.

12. The method of claim 10, wherein the first set of intensity data comprises:

first intensity data indicative of an intensity of light, during the first time interval, with a first wavelength; and second intensity data indicative of an intensity of light, during the first time interval, with a second wavelength.

13. The method of claim 10, further comprising:

selecting the first interacquisition time interval; and increasing a likelihood of detecting artifacts by selecting the second interacquisition time interval to be different than the first interacquisition time interval.

14. The method of claim 10, further comprising:

operating one or more of the one or more light sources at a first output intensity during the first time interval;

determining, based on the first output intensity and at least a portion of the first set of intensity data, a differential value; and determining first data based on a comparison between the differential value and a threshold range.

15. The method of claim 10, further comprising:

determining that the first value indicates user presence; and acquiring biometric input.

16. The method of claim 10, wherein the acquiring the first set of intensity data comprises:

integrating intensity data for the second plurality of wavelengths.

17. A device comprising:

a plurality of light sources to emit at a first plurality of wavelengths;

a spectrometer to determine intensity data indicative of an intensity of incident light at a second plurality of wavelengths, wherein the second plurality of wavelengths is a subset of the first plurality of wavelengths;

a memory, storing first computer-executable instructions; and a hardware processor to execute the first computer-executable instructions to:

operate the plurality of light sources to emit light comprising the first plurality of wavelengths during a first time interval;

acquire, during the first time interval, a first set of intensity data using the spectrometer, wherein the first set of intensity data is indicative of intensity of light for each wavelength of the second plurality of wavelengths;

operate the plurality of light sources to emit light comprising the first plurality of wavelengths during a second time interval, wherein a first interacquisition interval represents a time interval between an end of the first time interval and a beginning of the second time interval;

acquire, during the second time interval, a second set of intensity data using the spectrometer, wherein the second set of intensity data is indicative of intensity of light for each wavelength of the second plurality of wavelengths;

operate the plurality of light sources to emit light comprising the first plurality of wavelengths during a third time interval, wherein:

a second interacquisition interval represents a time interval between an end of the second time interval and a beginning of the third time interval, and the first interacquisition time interval is different than the second interacquisition time interval;

acquire, during the third time interval, a third set of intensity data using the spectrometer, wherein the third set of intensity data is indicative of intensity of light for each wavelength of the second plurality of wavelengths; and determine, based on the first set of intensity data and the second set of intensity data and the third set of intensity data, a first value indicative of whether an object is a user or an artifact.

18. The device of claim 17, wherein during operation the spectrometer integrates intensity data for a plurality of wavelengths of at least a portion of the second plurality of wavelengths during the first time interval.

19. The device of claim 17, the hardware processor to further execute the first computer-executable instructions to:

operate one or more of the plurality of light sources at a first output intensity during the first time interval;

operate the one or more of the plurality of light sources at a second output intensity during the second time interval; and operate the one or more of the plurality of light sources at a third output intensity during the third time interval.

20. The device of claim 17, the hardware processor to further execute the first computer-executable instructions to:

operate one or more of the plurality of light sources at a first output intensity during the first time interval;

determine, based on the first output intensity and at least a portion of the first set of intensity data, a differential value;

determine the differential value is outside of a threshold range; and determine a second value, wherein the second value is indicative of an anomalous condition.

\* \* \* \* \*